US012579319B2

(12) United States Patent
Griffin et al.

(10) Patent No.: US 12,579,319 B2
(45) Date of Patent: Mar. 17, 2026

(54) UNIKERNEL CATALOG FOR STORING AND FACILITATING DEPLOYMENT OF UNIKERNELS

(71) Applicant: RED HAT, INC., Raleigh, NC (US)

(72) Inventors: Leigh Griffin, Waterford (IE); Sherine Khoury, Cuges les Pins (FR); Luigi Mario Zuccarelli, Morro d'Alba (IT)

(73) Assignee: Red Hat, Inc., Raleigh, NC (US)

( * ) Notice: Subject to any disclaimer, the term of this patent is extended or adjusted under 35 U.S.C. 154(b) by 160 days.

(21) Appl. No.: 18/367,530

(22) Filed: Sep. 13, 2023

(65) Prior Publication Data

US 2025/0086322 A1 Mar. 13, 2025

(51) Int. Cl.
| | |
|---|---|
| *G06F 21/00* | (2013.01) |
| *G06F 21/31* | (2013.01) |
| *G06F 21/55* | (2013.01) |
| *G06F 21/64* | (2013.01) |

(52) U.S. Cl.
CPC .............. *G06F 21/64* (2013.01); *G06F 21/31* (2013.01); *G06F 21/554* (2013.01)

(58) Field of Classification Search
CPC ........ G06F 21/64; G06F 21/31; G06F 21/554; G06F 2009/4557; G06F 9/45558; G06F 8/63
See application file for complete search history.

(56) References Cited

U.S. PATENT DOCUMENTS

| | | | |
|---|---|---|---|
| 9,886,303 | B2 | 2/2018 | Koller Jemio et al. |
| 10,409,654 | B2 | 9/2019 | Behrendt et al. |
| 11,321,107 | B1 | 5/2022 | Eyberg et al. |
| 11,892,418 | B1 * | 2/2024 | Featonby .................. G06F 8/71 |
| 2012/0291021 | A1 * | 11/2012 | Banerjee ............. G06F 9/45558 |
| | | | 717/173 |
| 2020/0183726 | A1 * | 6/2020 | Heindl ................ G06F 9/45558 |
| 2020/0264941 | A1 * | 8/2020 | Drepper .................. G06F 9/545 |
| 2023/0128720 | A1 * | 4/2023 | Cohen ..................... G06F 21/31 |
| | | | 726/26 |

OTHER PUBLICATIONS

Madhavapeddy et al., "Unikernels: Rise of the Virtual Library Operating System", ACM Digital Library, Nov. 1, 2013; pp. 1-15.
European Search Report, EP 24194807.4, Feb. 11, 2025, 10 pages.

(Continued)

*Primary Examiner* — Ghazal B Shehni
(74) *Attorney, Agent, or Firm* — Kilpatrick Townsend & Stockton LLP

(57) ABSTRACT

Unikernel catalogs can be used to store and to facilitate efficient deployment of unikernels. For example, a node of a distributed computing environment can include a controller for deploying a unikernel at a target device. The controller can deploy the unikernel at the target device by receiving a unikernel catalog and catalog metadata. The unikernel catalog can include one or more unikernels, and each of the unikernels can include unikernel metadata and executable files. The controller can further execute a catalog checkup to verify the unikernel catalog. In response to verifying the unikernel catalog, the controller can extract the unikernel from the unikernel catalog. The target device may then receive the unikernel from the controller and execute the executable files of the unikernel.

17 Claims, 8 Drawing Sheets

200 →

202
Copy a unikernel catalog from a location

204
Run catalog checkup on the unikernel catalog

206
Determine whether the unikernel catalog passed the catalog check up

208
Transmit Error Message

No

Yes

210
Extract at least one unikernel from the unikernel catalog

212
Determine that the unikernel is ready for execution

(56)          References Cited

OTHER PUBLICATIONS

Tan Bo et al., Towards Lightweight Serverless Computing via Unikernel as a Function, 2020 IEEE/ACM 28th International Symposium on Quality of Service (IWQOS), IEEE, Jun. 15, 2020, pp. 1-10, XP033834602, retrieved Oct. 5, 2020.
Pianoman320, "Unikernel", Aug. 24, 2016, XP055594632, retrieved from the Internet: URL:https://en.wikipedia.org/w/index.php?title= Unikernel&oldid=736047435, retrieved Jun. 6, 2019.
Examination Report, EP 24194807.4, Oct. 13, 2025, 4 pages.

* cited by examiner

100 →

200 →

300

400

402
Receive, by a controller, a unikernel catalog comprising a plurality of unikernels

404
Execute, by the controller, a catalog checkup to verify the unikernel catalog

406
Extract, by the controller, a unikernel of the plurality of unikernels associated with a target device from the unikernel catalog

408
Deploy, by the controller, the unikernel at the target device

500

600 →

700

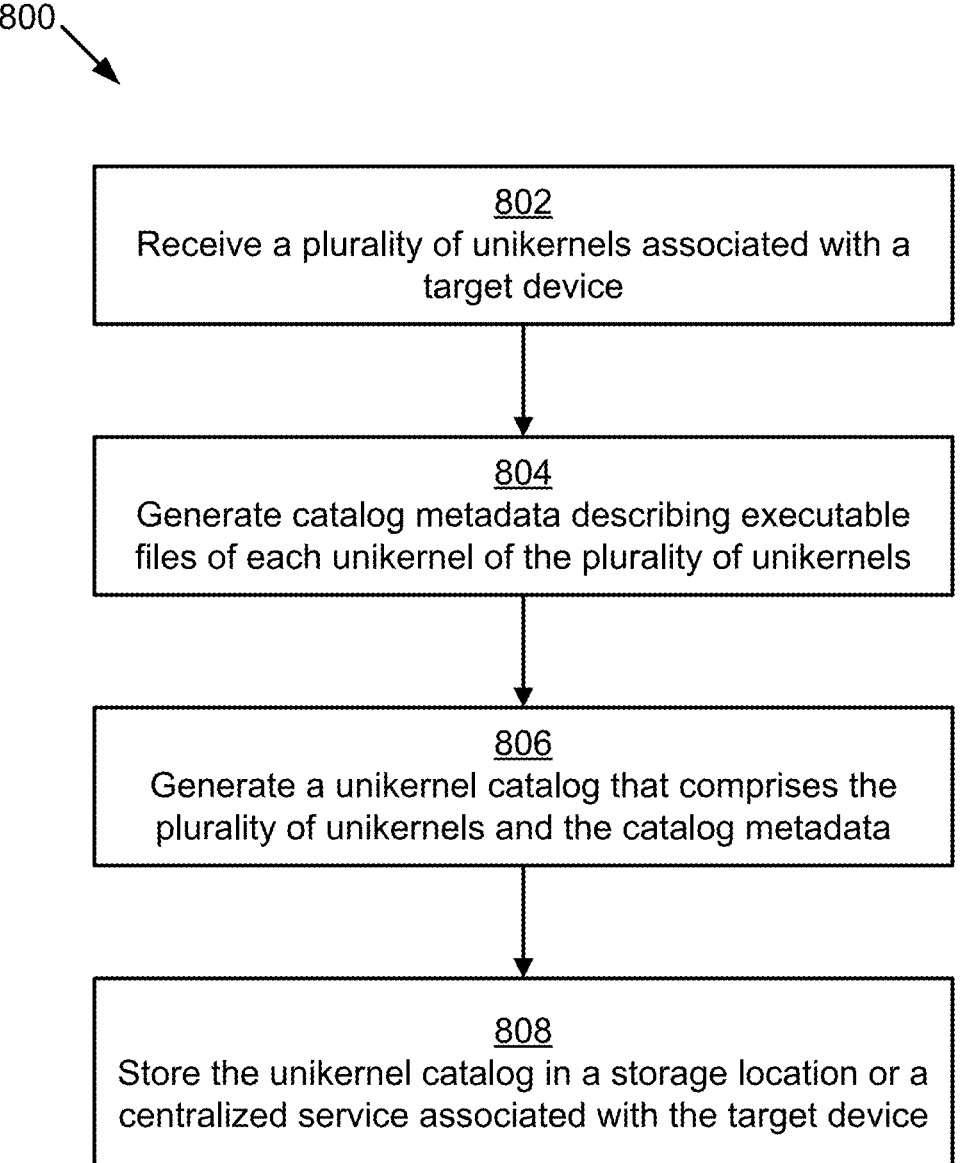

800

<u>802</u>
Receive a plurality of unikernels associated with a
target device

<u>804</u>
Generate catalog metadata describing executable
files of each unikernel of the plurality of unikernels <u>806</u>
Generate a unikernel catalog that comprises the
plurality of unikernels and the catalog metadata <u>808</u>
Store the unikernel catalog in a storage location or a
centralized service associated with the target device

FIG. 8

UNIKERNEL CATALOG FOR STORING AND FACILITATING DEPLOYMENT OF UNIKERNELS

TECHNICAL FIELD

The present disclosure relates generally to distributed computing environments and, more particularly (although not necessarily exclusively), to generating unikernel catalogs and using the unikernel catalogs to store and deploy unikernels.

BACKGROUND

Unikernels can be specialized, single address space machine images constructed using library operating systems and designed to run a single application or service. For example, to build a unikernel, a developer may select a minimal set of libraries corresponding to operating system (OS) constructs required to execute an application. Then, the application, configuration code for the application, and the set of libraries can be compiled in a standalone binary image (e.g., the unikernel). The unikernel can then run directly on a hypervisor or hardware associated with a computing system without interfering with an underlying OS of the computing system. Thus, the unikernel can provide a resource efficient and isolated means of deploying and executing applications. Additionally, in contrast to traditional operating systems that may provide a full suite of services and functionality, the unikernels can be highly specialized and optimized for specific tasks.

BRIEF DESCRIPTION OF THE DRAWINGS

FIG. 8 is a flowchart of an example of a process for generating a unikernel catalog according to one example of the present disclosure.

DETAILED DESCRIPTION

Figure 1:
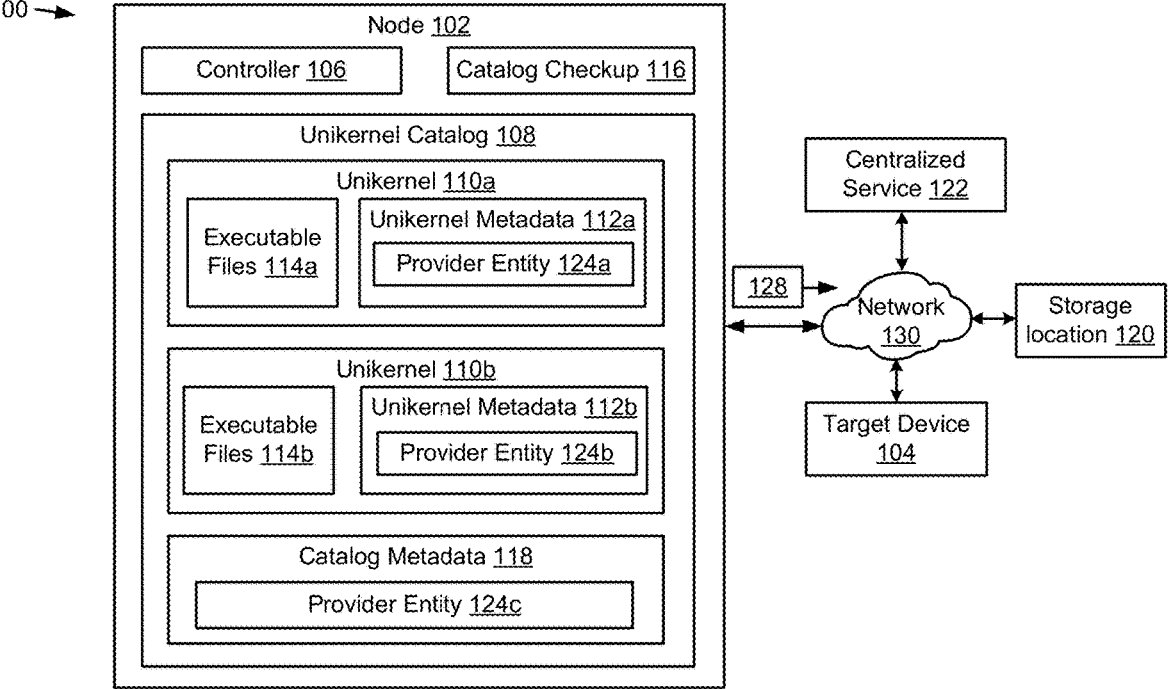
FIG. 1 is a block diagram of an example of a system for deploying unikernels using a unikernel catalog according to one embodiment of the present disclosure.

In current systems, deployment of unikernels in computing environments, such as virtualized environments, cloud platforms, or edge nodes can be inefficient. For example, a unikernel may be developed, adapted, updated, or a combination thereof to meet specific requirements of hardware or software of a computing environment prior to deployment. The unikernel may also be developed, adapted, updated, or a combination thereof based on a specific application or task being implemented in the computing environment via the unikernel before deployment. Thus, preparing a unikernel for deployment can be computationally expensive and can cause latency for the computing environments. For example, a unikernel may be used in a booting process of an edge node, and a time period required to prepare and deploy the unikernel may cause latency for the booting process of the edge node.

Additionally, for a computing environment at which multiple unikernels may be deployed, the current systems may develop, prepare, and deploy each unikernel separately, which can also be computationally expensive and cause latency within the computing environment. Moreover, for applications, services, or computing environments with high security requirements, storing, transmitting, or otherwise interacting with unikernels via global networks (e.g., the internet) may not be plausible. Similarly, some computing environments may receive or transmit information via a local network, a mesh network, or other suitable local communication methods rather than the global networks. Thus, there can be a need for a secure method for storing pre-developed unikernels, from which the pre-developed unikernels can be efficiently updated, retrieved, and deployed at various computing environments.

Some examples of the present disclosure overcome one or more of the abovementioned problems via unikernel catalogs. For example, a unikernel catalog can be generated to include one or more unikernels associated with a computing environment. A controller may be operating on or in connection with the computing environment to manage the computing environment. For example, the controller may manage unikernel deployment at the computing environment by retrieving the unikernel catalog. To do so, the unikernel catalog can be stored in a location available to the controller. For example, the unikernel catalog can be stored on a portable device, on a local disk, in a centralized service accessible via a local network or the internet, or in another suitable location. Thus, the unikernel catalog can be stored in a manner that is accessible by the controller and meets security requirements of the computing environment.

In addition to the unikernels, the unikernel catalog can include catalog metadata describing the unikernels. The controller may further manage unikernel deployment by determining, from the catalog metadata, which unikernels are included in the unikernel catalog, a provider entity of the unikernel catalog or of the unikernels, version or update information for the unikernels, or other suitable information associated with the unikernels.

The controller may further perform a catalog checkup of the unikernel catalog. The catalog checkup can involve the controller verifying that a provider entity of the unikernel catalog is a secure provider entity, verifying that provider entity signatures of the unikernels are accurate, or otherwise confirming that the unikernel catalog does not pose a security threat to the computing environment. If the unikernel catalog passes the catalog checkup, the controller can extract one or more unikernels from the unikernel catalog and can deploy the one or more unikernels in the computing environment. Thus, the controller can perform the catalog checkup to ensure secure deployment of the unikernels. Additionally, because several unikernels can be verified, extracted, and deployed from a unikernel catalog, the unikernels can be prepared and deployed in a computationally efficient manner. This can also reduce latency for the computing environment in which the unikernels are deployed.

In one particular example, a vehicle can be interacting with a distributed computing environment. The vehicle can include a controller for managing and deploying unikernels on target devices, such as cameras, sensors, or other suitable devices, associated with the vehicle. The controller may receive a unikernel catalog by copying the unikernel catalog from storage location, such as a USB device. The unikernel catalog can include unikernels associated with the target devices and catalog metadata describing the unikernels. Additionally, each of the unikernels can include executable files related to a task or application for a target device.

After copying the unikernel catalog, the controller may execute a catalog checkup to verify the unikernel catalog. For example, the controller may verify the unikernel catalog by determining that a signature indicating a provider entity of the unikernel catalog is an acceptable signature. The signature may be included in the catalog metadata. In response to verifying the unikernel catalog, the controller may extract a unikernel from the unikernel catalog and may deploy the unikernel at a target device. For example, the target device can be a temperature sensor module associated with a temperature sensor (e.g., a thermistor) of the vehicle. The unikernel can be deployed at the temperature sensor module to perform temperature data collection and analysis.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for deploying unikernels 110a-b using a unikernel catalog 108 according to one embodiment of the present disclosure. The system 100 may include one or more nodes, such as node 102, which may communicate using a network 130. Examples of the network 130 can include a local area network (LAN) or the Internet. The system 100 may also include a centralized service 122, a target device 104, and a storage location 120. The node 102 and the target device 104 may be edge nodes that may be located physically close to or within an access range of one another. The node 102, the target device 104, or a combination thereof can be responsible for data processing, analysis, storage, or a combination thereof within a computing environment, such as a distributed computing environment.

As depicted, a controller 106 may be a software component operating on the node 102. In other examples, the controller 106 may be embedded within the target device 104. Thus, the controller 106 can be defined as a software-based or hardware-based component of the system 100 responsible for managing the target device 104 at least in part by discovering, extracting, and deploying unikernels. Examples of the node 102 may include servers, routers, controllers, or other suitable types of edge nodes. Examples of the target device 104 may include resource-constrained devices, such as microcontrollers, smart devices, sensors, etc. Additional examples of the target device 104 may include edge devices, such as smartphones, tablets, wearable devices, vehicles, Internet of Things (IoT) devices, etc.

In some examples, the controller 106 may be configured to deploy unikernels 110a-b at the target device 104 using a unikernel catalog 108. The unikernel catalog 108 can be a file or set of files stored in the storage location 120, in the centralized service 122, or a combination thereof. The unikernel catalog 108 can include a set of related unikernels 110a-b that form a coherent ensemble. For example, a first unikernel 110a can be a webserver unikernel and a second unikernel 110b can implement a caching mechanism for the webserver unikernel.

Each of the unikernels 110a-b can include executable files 114a-b and unikernel metadata 112a-b. The executable files 114a-b can be binary files containing operating system components, application code, libraries, dependencies, or other suitable components required to execute a single application or service. For example, first executable files 114a can include components required for executing a webserver and second executable files 114b can include components required for executing the caching mechanism. The executable files 114a-b can be customized to only implement the single application or service and can therefore be light weight and efficient in comparison with traditional operating systems. The unikernel metadata 112a-b can describe the executable files 114a-b.

The unikernel metadata 112a-b may further include indications (e.g., signatures) of provider entities 124a-b for the unikernels 110a-b. For example, first unikernel metadata 112a can include a first signature for a first provider entity 124a of the first unikernel 110a. Additionally, second unikernel metadata 112b can include a second signature for a second provider entity 124b of the second unikernel 110b. The provider entities 124a-b can be organizations, companies, services, or the like used for producing the unikernels 110a-b. The unikernel catalog 108 can also include catalog metadata 118, which can include a third provider entity 124c for the unikernel catalog 108. Thus, in an example, the first provider entity 124a can be a first organization through which the first unikernel 110a was developed, the second provider entity 124b can be a second organization through which the second unikernel 110b was developed, and the third provider entity 124c can be a service associated with the first and second organizations that packaged the unikernels 110a-b to generate the unikernel catalog 108. The catalog metadata 118 may also include a list of the unikernels 110a-b, descriptions of the unikernels 110a-b, or other suitable information.

Figure 5:
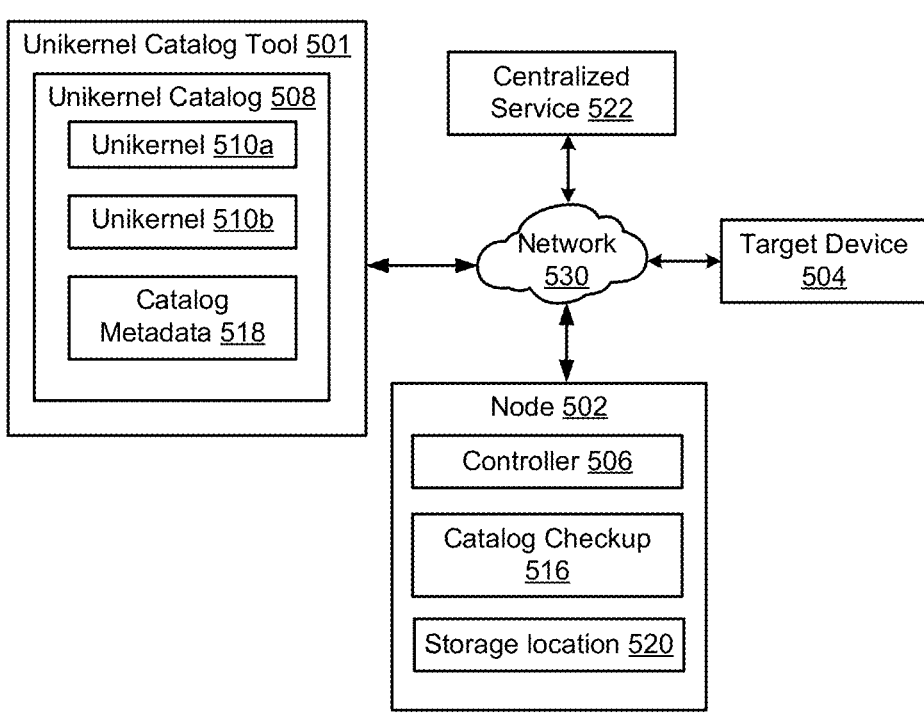
FIG. 5 is a block diagram of an example of a system for generating a unikernel catalog according to one embodiment of the present disclosure.

In some examples, the service may be or include a unikernel catalog tool, such as the unikernel catalog tool 501 depicted in FIG. 5. The unikernel catalog tool can generate the unikernel catalog 108. For example, the unikernel catalog tool may receive the unikernels 110a-b from the provider entities 124a-b. Additionally or alternatively, the unikernels 110a-b may be stored independently in the centralized service 122, the storage location 120, or a combination thereof. Thus, the unikernel catalog tool may receive the unikernels 110a-b by accessing the centralized service 122 or the storage location 120 and retrieving the unikernels 110a-b or copies of the unikernels 110a-b. The unikernel catalog tool may then generate the unikernel catalog 108 by zipping the unikernels 110a-b together into a single zip file or by otherwise generating a file or set of files that includes the unikernels 110a-b. Additionally, the unikernel catalog tool may store the unikernel catalog 108 in the centralized service 122 or the storage location 120. Thus, the unikernel catalog tool can provide related unikernels as an integrated set to facilitate efficient preparation and deployment.

To deploy the unikernels 110a-b at the target device 104, the controller 106 may receive or copy a unikernel catalog 108 from the storage location 120. The storage location 120 can be a local disk on the target device 104, a portable drive (e.g., a USB device, external hard drive, or the like), an s3 bucket, or another suitable storage location. Additionally or alternatively, the controller 106 may receive or copy the unikernel catalog 108 from the centralized service 122. The centralized service 122 can be an online registry of unikernel images, unikernel catalogs, or a combination thereof. The unikernel images can be the binary files (e.g., the executable files 114*a-b*) consisting of the components (e.g., operating system components, application code, etc.) required to execute the single application or service. In some examples, the executable files 114*a-b* and associated unikernel metadata 112*a-b* can be zipped together and stored in the centralized service 122 as the unikernel catalog 108. Developers may upload, manage, distribute the unikernel images or unikernel catalogs to various environments for development, testing, or the like via the centralized service 122. Thus, the centralized service 122 can enable seamless integration of unikernel preparation and deployment pipelines, thereby simplifying and streamlining processes of developing, updating, sharing, and executing unikernels across various environments.

In an example, to receive the unikernel catalog 108 stored in the centralized service 122, the controller 106 may transmit a request for the unikernel catalog 108 to the centralized service 122. The controller 106 may transmit the request based on one or both of the unikernels 110*a-b* being associated with the target device 104 or based on one or both of the unikernels 110*a-b* being customized to execute a desired application or service for the target device 104. In response, the centralized service 122 may transmit the unikernel catalog 108 or a copy of the unikernel catalog 108 to the controller. The controller 106 may then analyze the unikernels 110*a-b* of unikernel catalog 108, store the unikernel catalog 108 at the storage location 120, or a combination thereof.

Additionally, after receiving the unikernel catalog 108, the controller 106 can execute a catalog checkup 116 to verify the unikernel catalog 108. Verifying the unikernel catalog 108 can involve authenticating the unikernel catalog 108, performing security checks on the unikernel catalog 108 (e.g., by analyzing the unikernels 110*a-b* of the unikernel catalog 108 for vulnerabilities), checking that a size of files of the unikernel catalog 108 or of the unikernels 110*a-b* in the unikernel catalog 108 are acceptable for the target device 104, or checking that the unikernel catalog 108 and unikernels 110*a-b* have sufficient resources for and are compatible with components (e.g., central processing unit (CPU), random-access memory (RAM), disk, sensors, firmware, etc.) of the target device 104. For example, the controller 106 can analyze the unikernel metadata 112*a-b* to determine the provider entities 124*a-b* for each of the unikernels 110*a-b*. The controller 106 may then verify that the provider entities 124*a-b* are secure provider entities. The provider entities 124*a-b* can be secure provider entities if the controller 106 recognizes, trusts, or otherwise determines the provider entities 124*a-b* are secure. For example, the controller 106 may verify that the signatures in the unikernel metadata 112*a-b* are representative of a secure provider entity. The controller 106 may further verify that the provider entities 124*a-b* indicated by the signatures are the correct or expected provider entities for the unikernels 110*a-b*. The controller 106 may also analyze the catalog metadata 118 to determine the third provider entity 124*c* for the unikernel catalog 108. The controller 106 may also verify that the third provider entity 124*c* for the unikernel catalog 108 is a secure provider entity, that the third provider entity 124*c* is the expected or correct provider entity for the unikernel catalog 108, or a combination thereof.

In some examples, the controller 106 may detect a verification failure during execution of the catalog checkup 116. For example, the controller may detect that the first signature for the first provider entity 124*a* is incorrect or is associated with a malicious entity. In response to detecting the verification failure, the controller 106 may transmit a notification 128 indicating that the verification failure has occurred to a device belonging to a developer of the first unikernel 110*a*, to the target device 104, or to another node or client device associated with the unikernels 110*a-b* or the system 100. The controller 106 may also determine a cause of the verification failure, such as that the first signature is associated with the malicious entity. Thus, the notification 128 indicating the verification failure may further include or indicate the cause of the verification failure. Additional examples of causes of the verification failure may include the unikernel catalog 108 missing a particular unikernel, the unikernel catalog 108 or one of the unikernels 110*a-b* failing to meet security requirements of the target device 104, a corruption in the executable files 114*a-b*, insufficient memory space on the target device 104 for the executable files 114*a-b*, etc.

Conversely, if the catalog checkup 116 results in the controller 106 verifying the unikernel catalog 108, the unikernel catalog 108 can be used to deploy one or more of the unikernels 110*a-b*. For example, the controller 106 may extract the first unikernel 110*a* from the unikernel catalog 108. To do so, the controller 106 may load the first executable files 114*a*, the first unikernel metadata 112*a*, or a combination thereof and transmit the first executable files 114*a*, the first unikernel metadata 112*a*, or the combination thereof to the target device 104. As a result, the target device 104 can receive the components (e.g., the first unikernel 110*a*) for executing the webserver. The target device 104 can execute the first executable files 114*a* and may do so based on the information included in the first unikernel metadata 112*a*. Accordingly, the first unikernel 110*a* can be deployed at the target device 104.

The controller 106 may also extract the second unikernel 110*b* from the unikernel catalog 108 by loading the second executable files 114*b*, the second unikernel metadata 112*b*, or a combination thereof. The controller 106 can then transmit the second executable files 114*b*, the second unikernel metadata 112*b*, or the combination thereof to the target device 104. As a result, the target device 104 can receive the components for executing the caching mechanism for the webserver. The target device 104 can then execute the second executable files 114*b* to deploy the second unikernel 110*b* at the target device 104.

Thus, the unikernel catalog 108 can be used to deploy related unikernels at the target device 104 in a computationally efficient manner. Additionally, because the unikernels 110*a-b* have been verified via the catalog checkup 116, the deployment of the unikernels 110*a-b* can be secure. Moreover, due to the unikernels 110*a-b* being verified at and loaded from the unikernel catalog 108 rather than separately, the unikernels 110*a-b* can be deployed efficiently to reduce latency at the target device 104.

Although FIG. 1 depicts a certain number and arrangement of components, other examples may include more components, fewer components, different components, or a different number of the components that is shown in FIG. 1. For instance, the system can include more nodes than are shown in FIG. 1. Additionally, while one target device is shown in FIG. 1, in other examples the system 100 may include more target devices.

Figure 2:
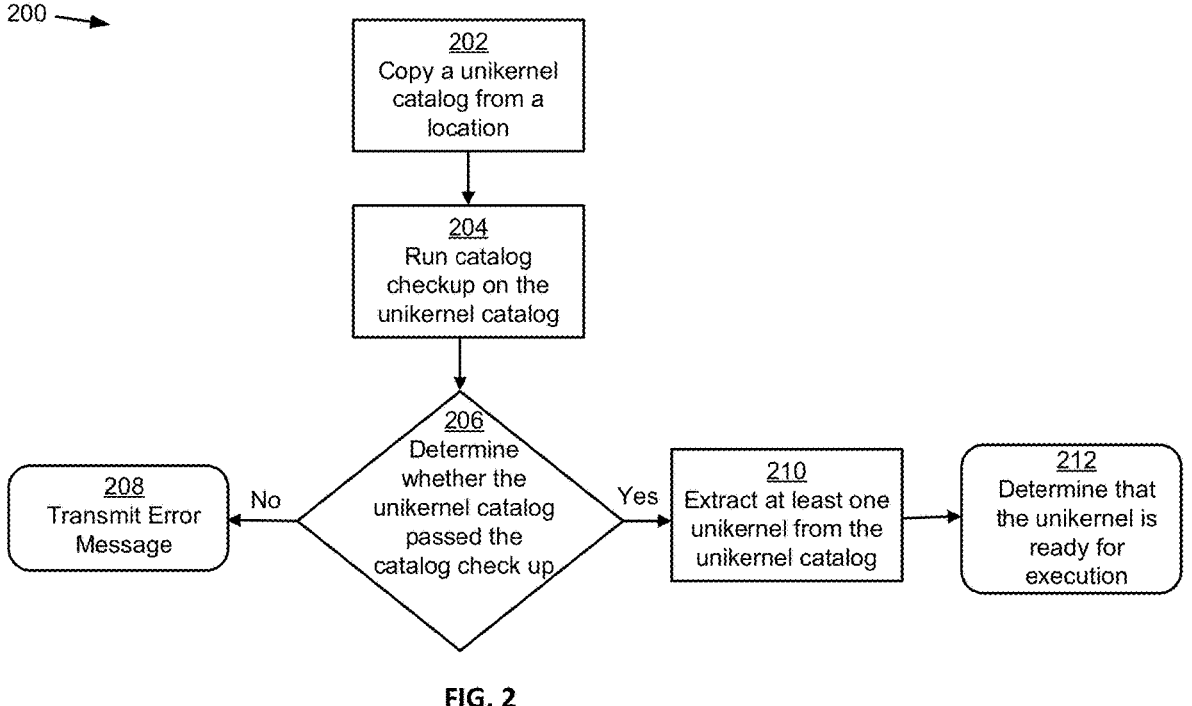
FIG. 2 is a flowchart of an example of a process for deploying unikernels using a unikernel catalog according to one embodiment of the present disclosure.

FIG. 2 is a flowchart of an example of a process 200 for deploying unikernels using a unikernel catalog according to one embodiment of the present disclosure. The process 200 of FIG. 2 can be implemented by the controller 106 of FIG. 1 or the processing device 303 of FIG. 3, but other implementations are also possible. While FIG. 2 depicts a certain sequence of steps for illustrative purposes, other examples can involve more steps, fewer steps, different steps, or a different order of the steps depicted in FIG. 2. The steps of FIG. 2 are described below with reference to the components of FIG. 1 described above.

At block 202, the controller 106 can copy a unikernel catalog 108 from a location. For example, the controller 106 can copy the unikernel catalog 108 from a centralized service 122 in which various unikernel images and unikernel catalogs are stored. The controller 106 may copy of the unikernel catalog 108 from the centralized service 122 via a secure communication protocol, such as Hypertext Transfer Protocol Secure (HTTPS).

At block 204, the controller 106 can run a catalog checkup 116 on the unikernel catalog 108. For example, the controller 106 can analyze unikernel metadata 112a-b of unikernels 110a-b included in the unikernel catalog 108. In doing so, the controller 106 can determine and verify a first provider entity 124a of a first unikernel 110a and a second provider entity 124b of a second unikernel 110b. Additionally, the controller 106 can analyze catalog metadata 118 of the unikernel catalog 108 to determine and verify a third provider entity 124c of the unikernel catalog 108. The controller 106 may also verify, via the catalog checkup 116, that the unikernels 110a-b do not include security flaws (e.g., corrupted files), that the unikernels 110a-b meet security requirements of the target device 104, or otherwise verify that the unikernels 110a-b are compatible with and safe for deployment at the target device 104.

At block 206, the controller 106 can determine whether the unikernel catalog 108 passed the catalog checkup 116. In a first example, an executable file of first executable files 114a for the first unikernel 110a may be corrupted. As a result, the controller 106 can detect the corruption during the catalog checkup 116 and can determine that the unikernel catalog 108 fails the catalog checkup 116. In a second example, the controller 106 may not detect any security flaws or other suitable issues with the unikernel catalog 108. Thus, the controller 106 can determine that the unikernel catalog 108 passes the catalog checkup 116.

At block 208, the controller 106 can transmit an error message. In the first example, the controller 106 can transmit the error message in response to the unikernel catalog 108 failing the catalog checkup 116. The error message may be transmitted to a client device associated with a developer of one or both of the unikernels 110a-b or of the unikernel catalog 108. Additionally or alternatively, the error message can be transmitted to the centralized service 122, and may cause the unikernel catalog 108 to be flagged or otherwise signified as being unable to be deployed. In some examples, the error message can include a reason (e.g., the corrupt executable file) that the unikernel catalog 108 failed the catalog checkup 116.

At block 210, the controller 106 can extract at least one unikernel from the unikernel catalog. In the second example, the controller 106 can extract one or both of the unikernels 110a-b in response to the unikernel catalog 108 passing the catalog checkup 116. The controller 106 can extract, for example, the first unikernel 110a by loading the first executable files 114a, the first unikernel metadata 112a, or a combination thereof from the unikernel catalog 108. The controller 106 may further transmit the first executable files 114a, the first unikernel metadata 112a, or the combination thereof to the target device 104.

At block 212, the controller 106 can determine that the unikernel is ready for execution. For example, the controller 106 may determine that the first unikernel 110a is ready for execution based on the target device 104 receiving the first executable files 114a, the first unikernel metadata 112a, or a combination thereof. The target device 104 may then execute the first executable files 114a. Thus, the first unikernel 110a can be deployed at the target device 104.

Figure 3:
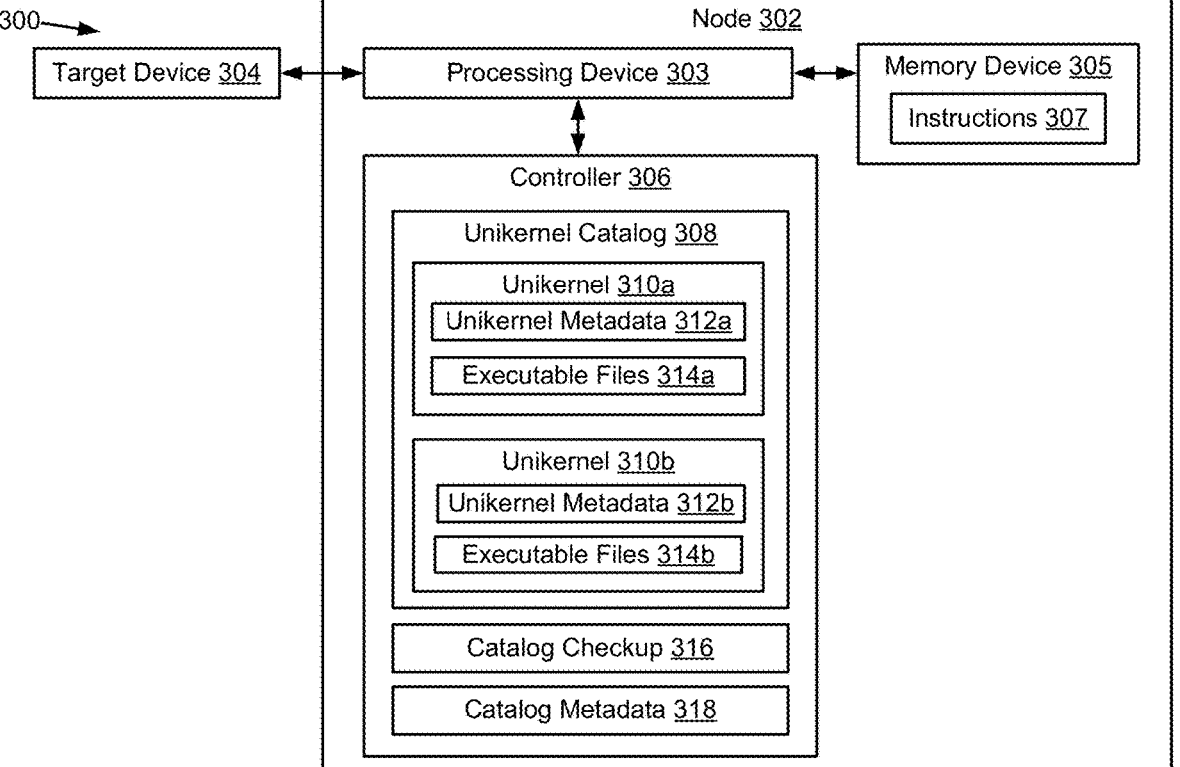
FIG. 3 is a block diagram of an example of a computing environment for deploying unikernels using a unikernel catalog according to one embodiment of the present disclosure.

FIG. 3 is a block diagram of an example of a computing environment 300 for deploying unikernels using a unikernel catalog according to one embodiment of the present disclosure. The computing environment 300 depicted in FIG. 3 includes a processing device 303 communicatively coupled with a memory device 305. In some examples, the components of the computing environment, such as the processing device 303 and the memory device 305, may be part of a same computing device, such as node 302. In other examples, the processing device 303 and the memory device 305 can be included in separate computing devices that are communicatively coupled.

The processing device 303 can include one processing device or multiple processing devices. Non-limiting examples of the processing device 303 include a Field-Programmable Gate Array (FPGA), an application-specific integrated circuit (ASIC), a microprocessor, etc. The processing device 303 can execute instructions 307 stored in the memory device 305 to perform operations. In some examples, the instructions 307 can include processor-specific instructions generated by a compiler or an interpreter from code written in any suitable computer-programming language, such as C, C++, C#, etc.

The memory device 305 can include one memory or multiple memories. The memory device 305 can be non-volatile and may include any type of memory that retains stored information when powered off. Non-limiting examples of the memory device 305 include electrically erasable and programmable read-only memory (EEPROM), flash memory, or any other type of non-volatile memory. At least some of the memory can include a non-transitory computer-readable medium from which the processing device 303 can read instructions 307. The non-transitory computer-readable medium can include electronic, optical, magnetic, or other storage devices capable of providing the processing device with computer-readable instructions or other program code. Examples of the non-transitory computer-readable medium include magnetic disk(s), memory chip(s), ROM, RAM, an ASIC, a configured processor, optical storage, or any other medium from which a computer processor can read the instructions 307.

In some examples, the processing device 303 can execute the instructions 307 to perform some or all of the functionality described herein. For example, the processing device 303 can receive, by a controller 306, a unikernel catalog 308. The unikernel catalog 308 can include a plurality of unikernels 310a-b and catalog metadata 318. Additionally, each unikernel of the plurality of unikernels 310a-b can include unikernel metadata 312a-b and executable files 314a-b. The processing device 303 can also execute, by the controller 306, a catalog checkup 316 to verify the unikernel catalog 308. Then, in response to verifying the unikernel catalog 308, the processing device 303 can extract, by the controller 306, a unikernel 310a of the plurality of unikernels 310a-b associated with a target device 304 from the unikernel catalog 308. The processing device 303 can further deploy, by the controller 306, the unikernel 310a at the target device 304.

Figure 4:
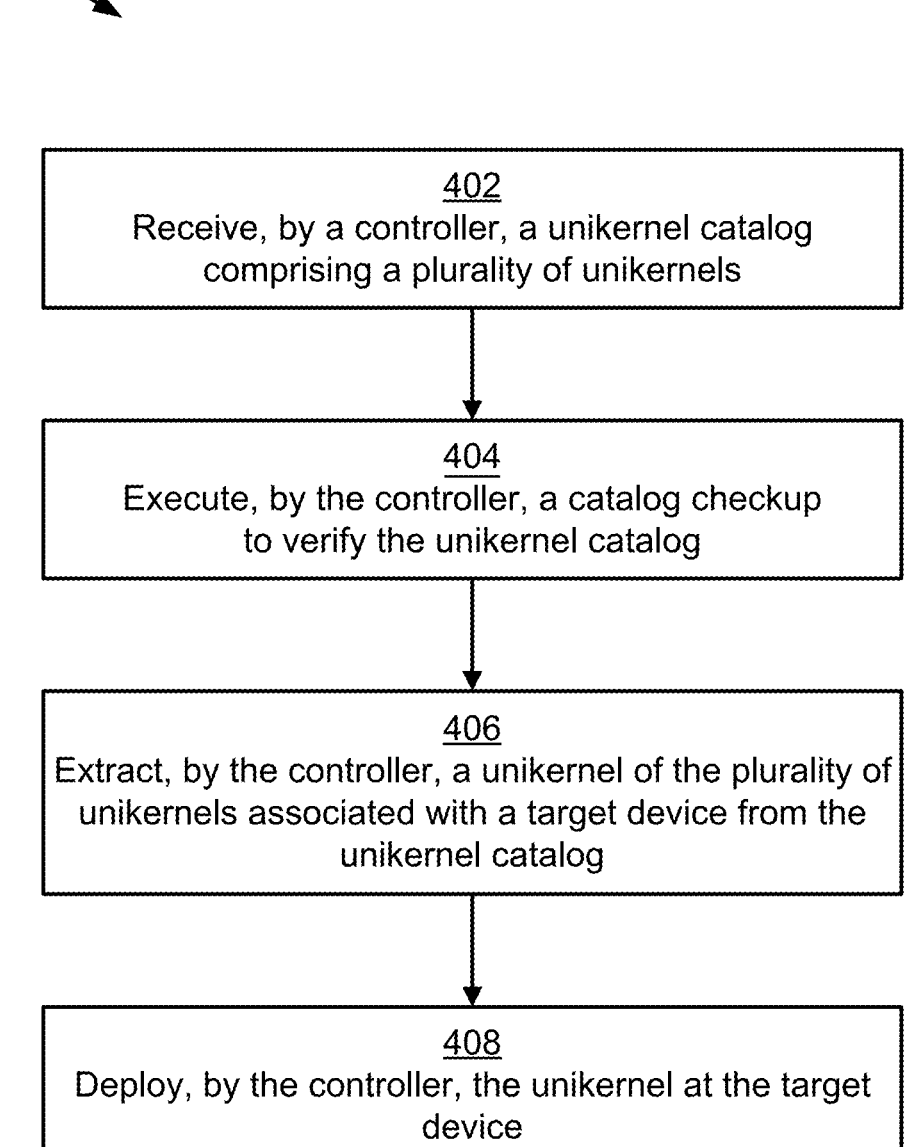
FIG. 4 is a flowchart of another example of a process for deploying unikernels using a unikernel catalog according to one embodiment of the present disclosure.

FIG. 4 is a flowchart of another example of a process 400 for deploying unikernels using a unikernel catalog according to one embodiment of the present disclosure. In some examples, the processing device 303 can implement some or all of the steps shown in FIG. 4. Additionally, in some examples, the processing device 303 can be executing the controller 106 of FIG. 1 to implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIGS. 1 and 3.

At block 402, the processing device 303 can receive, by a controller 106, a unikernel catalog 108 comprising a plurality of unikernels 110a-b. In a particular example, to reduce latency and improve performance of content delivery in a content delivery network (CDN), the unikernels 110a-b can be created and used to provide caching services. In particular, a first unikernel 110a can be used as a server that is specialized and tailored to respond to calls from edge devices in the CDN. A second unikernel 110b can then be used as a storage cache that is specialized and tailored to retrieve content from the edge devices (e.g., a local disk of an edge device). Thus, the unikernels 110a-b, in the particular example, can work together to provide the caching services. It may therefore be desirable to bundle the unikernels 110a-b in the unikernel catalog 108 and store the unikernel catalog 108 in, for example, a centralized service 122 accessible by the edge devices. In this way, the unikernels 110a-b can be efficiently deployed at the edge devices from the unikernel catalog 108. Additionally, the controller 106, in the particular example, can be managing the edge devices. Therefore, the processing device 303 may, via the controller 106, receive the unikernel catalog 108 by accessing the centralized service 122 and requesting a copy of the unikernel catalog 108 from the centralized service 122.

At block 404, the processing device 303 can execute, by the controller 106, a catalog checkup 116 to verify the unikernel catalog 108. For example, the unikernel catalog 108 can include catalog metadata 118. The catalog metadata 118 can include an indication (e.g., a signature) of a third provider entity 124c of the unikernel catalog 108. Thus, to verify the unikernel catalog 108 the processing device 303 can, via the controller 106, determine the third provider entity 124c based on the catalog metadata 118. Then, the controller 106 can verify that the third provider entity 124c is a secure provider entity. Additionally, each of the unikernels 110a-b can include unikernel metadata 112a-b. The unikernel metadata 112a-b can also include indications of provider entities 124a-b for the unikernels 110a-b. For example, first unikernel metadata 112a of a first unikernel 110a can include an indication of a first provider entity 124a, and second unikernel metadata 112b of a second unikernel 110b can include an indication of a second provider entity 124b. Thus, the processing device 303 can, by the controller 106, further determine the provider entities 124a-b based on the unikernel metadata 112a-b. Then, the controller 106 can verify that the provider entities 124a-b for each of the unikernels 110a-b are secure provider entities.

At block 406, the processing device 303 can extract, by the controller 106, a unikernel of the plurality of unikernels 110a-b associated with a target device 104 from the unikernel catalog 108. For example, the target device 104 can be a particular edge node in the CDN. The controller 106 can detect or determine that the unikernels 110a-b should be deployed at the particular edge node based on, for example, the unikernel metadata 112a-b signifying that the unikernels 110a-b are compatible with the particular edge node. Thus, the processing device 303 can, via the controller 106, extract the unikernels 110a-b from the unikernel catalog 108. To do so, the processing device 303 can, by the controller 106, load executable files 114a-b of both of the unikernels 110a-b.

At block 408, the processing device 303 can deploy, by the controller 106, the unikernel at the target device. For example, the controller 106 can transmit the executable files 114a-b to the particular edge node, which can execute the executable files 114a-b. As a result, the unikernels 110a-b can be deployed on the particular edge node to implement a caching service (e.g., the server and the storage cache) at the particular edge node.

FIG. 5 is a block diagram of an example of a system 500 for generating a unikernel catalog 508 according to one embodiment of the present disclosure. The system 500 may include one or more nodes, such as node 502, which may communicate using a network 530. Examples of the network 530 can include a local area network (LAN) or the Internet. The system 500 may also include a centralized service 522, a target device 504, and a unikernel catalog tool 501. The node 502 and the target device 504 may be edge nodes that may be located physically close to or within an access range of one another. The node 502, the target device 504, or a combination thereof can be responsible for data processing, analysis, storage, or a combination thereof within a computing environment, such as a distributed computing environment.

In some examples, the unikernel catalog tool 501 can generate a unikernel catalog 508. To do so, the unikernel catalog tool 501 may receive a first unikernel 510a and a second unikernel 510b. In an example, the unikernel catalog tool 501 may receive the first unikernel 510a from a first provider entity (e.g., Red Hat®). The unikernel catalog tool 501 may also receive the second unikernel 510b from the first provider entity or the unikernel catalog tool 501 may receive the second unikernel 510b from a second provider entity. The provider entities can be any suitable organization, company, service, or the like.

Additionally or alternatively, the unikernels 510a-b may be stored independently in the centralized service 522, a storage location 520, or a combination thereof. As depicted, the storage location 520 can be a local disk or other suitable storage location embedded within the node 502. In other examples, the storage location 120 can be a portable drive (e.g., a USB device, external hard drive, or the like), an s3 bucket, or another suitable storage location. The centralized service 122 can be an online registry of unikernel images, unikernel catalogs, or a combination thereof accessible via the network 530. Thus, the unikernel catalog tool 501 may receive the unikernels 510a-b by accessing the centralized service 122 or the storage location 120 and retrieving the unikernels 110a-b or copies of the unikernels 110a-b.

The unikernel catalog tool 501 may then generate catalog metadata 518. The catalog metadata 518 can include a list of the unikernels 510a-b, a description of executable files of each of the unikernels 510a-b, a signature or other suitable indication of a provider entity associated with the unikernel catalog tool 510, or other suitable information.

The unikernel catalog tool 501 can then generate the unikernel catalog 508. For example, the unikernel catalog tool 501 may zip the unikernels 510a-b into a single zip file or otherwise generate a file or set of files that includes the unikernels 510a-b. The unikernel catalog tool 501 can further zip or otherwise include a file with the catalog metadata 518 in the unikernel catalog 508. Each of the unikernels 510*a-b* can include the executable files and unikernel metadata. The executable files can be binary files containing operating system components, application code, libraries, dependencies, or other suitable components required to execute a single application or service. The unikernel metadata can include descriptions of the executable files, signatures for the provider entities of the unikernels 510*a-b*, or other information related to the unikernel 510*a-b*. The unikernel catalog tool 501 may combine the unikernels 510*a-b* based on the unikernels 510*a-b* being customized for the target device 504 or otherwise related.

After generating the unikernel catalog 508, the unikernel catalog tool 501 may store the unikernel catalog 508 in the centralized service 522 or the storage location 520. Thus, the unikernel catalog tool 501 can provide related unikernels as an integrated set and store the unikernels for subsequent use. In this way, the unikernel catalog tool 501 can facilitate efficient preparation and deployment of the unikernels.

Additionally, as depicted in FIG. 5, a controller 506 may be a software or hardware component operating on the node 502. In other examples, the controller 506 may be a component associated with the target device 504. The controller 506 can be defined as a software-based or hardware-based component of the system 500 responsible for managing the target device 504 at least in part by discovering, extracting, and deploying unikernels. Thus, in some examples, the controller 506 may be configured to copy the unikernel catalog 508 from the centralized service 522 or the storage location 520. As a result, the unikernel catalog 508 can be received at the node 502.

The controller 506 may then perform a catalog checkup 516 to verify the unikernel catalog 508. If the unikernel catalog 508 passes the catalog checkup 516, the controller 506 can extract one or more of the unikernels 510*a-b* from the unikernel catalog. For example, the controller 506 may load the executable files and unikernel metadata associated with the unikernels 510*a-b*. The controller 506 may then transmit the unikernels 510*a-b* to the target device 504.

Additionally, in some examples, the unikernel catalog tool 501 or the controller 506 may transfer the unikernel catalog 508 from the storage location 520 to the centralized service 522 or transfer the unikernel catalog 508 from the centralized service 522 to the storage location 520. In an example, transferring the unikernel catalog 508 from the storage location 520 to the centralized service 522 can make the unikernel catalog 508 available to additional nodes, target devices, etc. on the network 530. In another example, transferring the unikernel catalog 508 from the centralized service 522 to the storage location 520 can make the unikernel catalog 508 readily available to the node 502 or target device 504 associated with the storage location 520.

Figure 6:
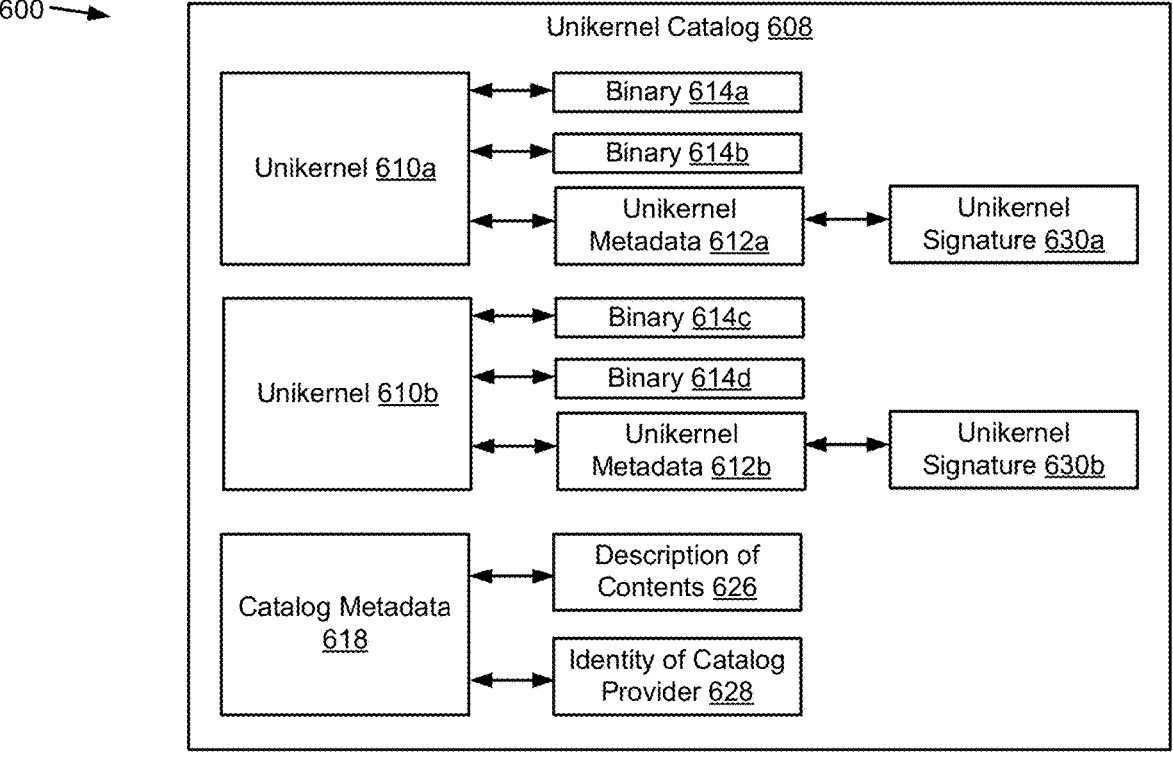
FIG. 6 is a block diagram of an example of a unikernel catalog according to one embodiment of the present disclosure.

FIG. 6 is a block diagram of an example of a unikernel catalog 608 according to one embodiment of the present disclosure. The unikernel catalog 608 can include a first unikernel 610*a* and a second unikernel 610*b*. The first unikernel 610*a* can include a first set of binary files 614*a-b*. Additionally, the second unikernel 610*b* can include a second set of binary files 614*c-d*. The binary files 614*a-d* can contain operating system components, application code, libraries, dependencies, or other suitable components required to execute a single application of service. For example, the first set of binary files 614*a-b* can include components required for executing a first application associated with the first unikernel 610*a*. The second set of binary files 614*c-d* can similarly include components required for executing a second application associated with the second unikernel 610*b*. The binary files 614*a-d* can be customized such that the binary files 614*a-d* only include the components necessary for implementing the first and second applications respectively.

The first unikernel 610*a* can further include first unikernel metadata 612*a*, and the second unikernel 610*b* can include second unikernel metadata 612*b*. The first unikernel metadata 612*a* can describe contents of the first set of binary files 614*a-b*, and the second unikernel metadata 612*b* can describe contents of the second set of binary files 614*c-d*. The unikernel metadata 612*a-b* may further include indications of provider entities for the unikernels 610*a-b*. For example, the first unikernel metadata 612*a* can include a first unikernel signature 630*a* for a first provider entity of the first unikernel 610*a*. Additionally, the second unikernel metadata 612*b* can include a second unikernel signature 630*b* for a second provider entity of the second unikernel 610*b*.

The unikernel catalog 608 can further include catalog metadata 618, which can include an identity of a catalog provider 628 for the unikernel catalog 608. The catalog metadata 618 may also include a list of the unikernels 610*a-b*, descriptions of contents 626 of the unikernels 610*a-b*, or other suitable information.

Figure 7:
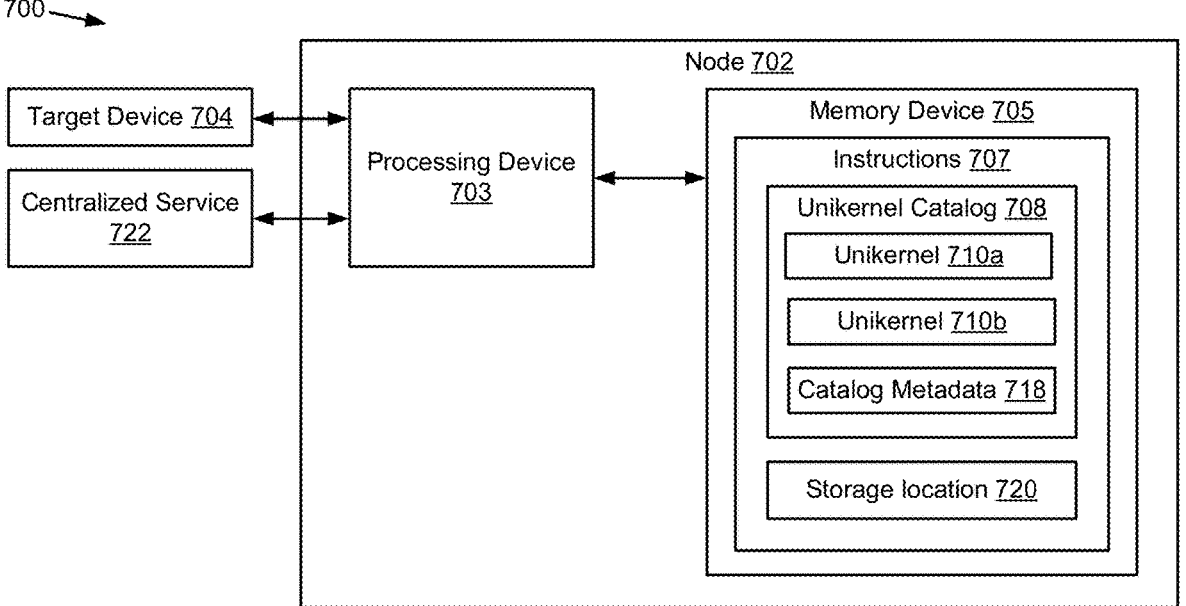
FIG. 7 is a block diagram of an example of a computing environment for generating a unikernel catalog according to one example of the present disclosure.

FIG. 7 is a block diagram of an example of a computing environment 700 for generating a unikernel catalog 708 according to one example of the present disclosure. The computing environment 700 depicted in FIG. 7 includes a processing device 703 communicatively coupled with a memory device 705. In some examples, the components of the computing environment, such as the processing device 703 and the memory device 705, may be part of a same computing device, such as node 702. In other examples, the processing device 703 and the memory device 705 can be included in separate computing devices that are communicatively coupled.

The processing device 703 can include one processing device or multiple processing devices. Non-limiting examples of the processing device 703 include a Field-Programmable Gate Array (FPGA), an application-specific integrated circuit (ASIC), a microprocessor, etc. The processing device 703 can execute instructions 707 stored in the memory device 705 to perform operations. In some examples, the instructions 707 can include processor-specific instructions generated by a compiler or an interpreter from code written in any suitable computer-programming language, such as C, C++, C#, etc.

The memory device 705 can include one memory or multiple memories. The memory device 705 can be non-volatile and may include any type of memory that retains stored information when powered off. Non-limiting examples of the memory device 705 include electrically erasable and programmable read-only memory (EEPROM), flash memory, or any other type of non-volatile memory. At least some of the memory can include a non-transitory computer-readable medium from which the processing device 703 can read instructions 707. The non-transitory computer-readable medium can include electronic, optical, magnetic, or other storage devices capable of providing the processing device with computer-readable instructions or other program code. Examples of the non-transitory computer-readable medium include magnetic disk(s), memory chip(s), ROM, RAM, an ASIC, a configured processor, optical storage, or any other medium from which a computer processor can read the instructions 707.

In some examples, the processing device 703 can execute the instructions 707 to perform some or all of the functionality described herein. For example, the processing device 703 can receive a plurality of unikernels 710*a-b* associated with a target device 704. The processing device 703 can also generate catalog metadata 718 describing executable files of each unikernel of the plurality of unikernels 710*a-b*. The processing device 703 can further generate a unikernel catalog 706 that comprises the plurality of unikernels 710*a-b* and the catalog metadata 718. Additionally, the processing device 703 can store the unikernel catalog 708 in a storage location 720 or in a centralized service 722 associated with the target device 704.

FIG. 8 is a flowchart of an example of a process 800 for generating a unikernel catalog according to one example of the present disclosure. In some examples, the processing device 703 can implement some or all of the steps shown in FIG. 8. Additionally, in some examples, the processing device 703 can be executing the unikernel catalog tool 501 of FIG. 5 to implement some or all of the steps shown in FIG. 8. Other examples can include more steps, fewer steps, different steps, or a different order of the steps than is shown in FIG. 8. The steps of FIG. 8 are discussed below with reference to the components discussed above in relation to FIGS. 5-7.

At block 802, the processing device 703 can receive a plurality of unikernels 510*a-b* associated with a target device 504. For example, the target device 504 can be a virtual machine and the unikernels 510*a-b* can be developed to run applications for the virtual machine. It can be desirable to run the applications using the unikernels 510*a-b* as the unikernels 510*a-b* can be light-weight, resource efficient, and secure. The unikernels 510*a-b* can also each provide application-level isolation, thereby preventing interference between applications and promoting stability for each application.

At block 804, the processing device 703 can generate catalog metadata 518 describing executable files of each unikernel of the plurality of unikernels 510*a-b*. The catalog metadata 518 can also include a list of the unikernels 510*a-b*, descriptions of each of the applications hosted by the unikernels 510*a-b*, an indicator (e.g., a signature) of a provider entity of the unikernel catalog 508, or other suitable information.

At block 806, the processing device 703 can generate a unikernel catalog 508 that comprises the plurality of unikernels 510*a-b* and the catalog metadata 518. For example, the processing device 703 can detect that both of the unikernels 510*a-b* include applications associated with the virtual machine. Thus, the processing device 703 may zip first executable files and metadata associated with the first unikernel 510*a* and second executable files and metadata associated with the second unikernel 510*b* into the unikernel catalog 508.

At block 808, the processing device 703 can store the unikernel catalog 508 in a storage location or a centralized service associated with the target device. For example, the processing device 703 may store the unikernel catalog 508 in a storage location accessible to a hypervisor managing the virtual machine. In the example, the storage location may be a local disk of a physical host on which the virtual machine is running.

Example 1 is a non-transitory computer-readable medium comprising instructions that are executable by a processing device for causing the processing device to: receive, by a controller, a unikernel catalog comprising a plurality of unikernels and catalog metadata, each unikernel of the plurality of unikernels comprising unikernel metadata and executable files; execute, by the controller, a catalog checkup to verify the unikernel catalog; in response to verifying the unikernel catalog: extract, by the controller, a unikernel of the plurality of unikernels associated with a target device from the unikernel catalog; and deploy, by the controller, the unikernel at the target device.

Example 2 is the non-transitory computer-readable medium of example 1, further comprising instructions executable by the processing device for causing the processing device to execute the catalog checkup to verify the unikernel catalog by: determining a provider entity for each unikernel of the plurality of unikernels based the unikernel metadata; and verifying that the provider entity for each unikernel of the plurality of unikernels is a secure provider entity.

Example 3 is the non-transitory computer-readable medium of example(s) 1-2, further comprising instructions executable by the processing device for causing the processing device to execute the catalog checkup to verify the unikernel catalog by: determining a provider entity for the unikernel catalog based on the catalog metadata; and verifying that the provider entity for the unikernel catalog is a secure provider entity.

Example 4 is the non-transitory computer-readable medium of example(s) 1-3, wherein the unikernel catalog is received from a centralized service configured to store a plurality of unikernel catalogs including the unikernel catalog, and further comprising instructions executable by the processing device for causing the processing device to, prior to receiving the unikernel catalog, request the unikernel catalog from the centralized service.

Example 5 is the non-transitory computer-readable medium of example(s) 1-4, wherein the unikernel catalog is received from a storage location accessible by the controller, wherein the storage location is a local disk or a portable drive, and further comprising instructions executable by the processing device for causing the processing device to, prior to receiving the unikernel catalog, access the storage location.

Example 6 is the non-transitory computer-readable medium of example(s) 1-5, further comprising instructions executable by the processing device for causing the processing device to: detect a verification failure during execution of the catalog checkup; in response to detecting the verification failure: determine a cause of the verification failure; and transmit a notification indicating the verification failure and the cause of the verification failure to the target device.

Example 7 is a method comprising: receiving, by a controller of a node in a distributed computing environment, a unikernel catalog comprising a plurality of unikernels; executing, by the controller, a catalog checkup to verify the unikernel catalog; in response to verifying the unikernel catalog: detecting, by the controller, a unikernel of the plurality of unikernels associated with a target device of the distributed computing environment; extracting, by the controller, the unikernel from the unikernel catalog; and deploying, by the controller, the unikernel at the target device.

Example 8 is the method of example 7, wherein each unikernel of the plurality of unikernels comprises unikernel metadata, and wherein executing the catalog checkup to verify the unikernel catalog comprises: determining a provider entity for each unikernel of the plurality of unikernels based the unikernel metadata; and verifying that the provider entity for each unikernel of the plurality of unikernels is a secure provider entity.

Example 9 is the method of example(s) 7-8, wherein the unikernel catalog further comprises catalog metadata, and wherein executing the catalog checkup to verify the unikernel catalog comprises: determining a provider entity for the unikernel catalog based on the catalog metadata; and verifying that the provider entity for the unikernel catalog is a secure provider entity.

Example 10 is the method of example(s) 7-9, wherein the unikernel catalog is received from a centralized service configured to store a plurality of unikernel catalogs including the unikernel catalog.

Example 11 is the method of example(s) 7-10, further comprising, prior to receiving the unikernel catalog, requesting the unikernel catalog from the centralized service.

Example 12 is the method of example(s) 7-11, wherein the unikernel catalog is received from a storage location associated with the node, wherein the storage location is a local disk or a portable drive, and wherein the method further comprises, prior to receiving the unikernel catalog, accessing the storage location.

Example 13 is the method of example(s) 7-12, further comprising: detecting a verification failure during the execution of the catalog checkup; in response to detecting the verification failure: determining a cause of the verification failure; and transmitting a notification indicating the verification failure and the cause of the verification failure to the target device.

Example 14 is a system comprising: a node of a distributed computing environment comprising: a controller configured to deploy a unikernel at a target device of the distributed computing environment by: receiving a unikernel catalog comprising a plurality of unikernels and catalog metadata, each unikernel of the plurality of unikernels comprising unikernel metadata and executable files; executing a catalog checkup to verify the unikernel catalog; in response to verifying the unikernel catalog, extracting a unikernel of the plurality of unikernels from the unikernel catalog; and the target device configured to receive the unikernel from the controller and to execute the executable files of the unikernel.

Example 15 is the system of example 14, wherein the controller executes the catalog checkup to verify the unikernel catalog by: determining a provider entity for each unikernel of the plurality of unikernels based the unikernel metadata; and verifying that the provider entity for each unikernel of the plurality of unikernels is a secure provider entity.

Example 16 is the system of example(s) 14-15, wherein the controller executes the catalog checkup to verify the unikernel catalog by: determining a provider entity for the unikernel catalog based on the catalog metadata; and verifying that the provider entity for the unikernel catalog is a secure provider entity.

Example 17 is the system of example(s) 14-16, further comprising a centralized service configured to store a plurality of unikernel catalogs including the unikernel catalog and configured to transfer the unikernel catalog to the node.

Example 18 is the system of example(s) 14-17, wherein the controller is further configured to, prior to receiving the unikernel catalog, request the unikernel catalog from the centralized service based on at least one unikernel of the plurality of unikernels being associated with the target device.

Example 19 is the system of example(s) 14-18, further comprising a unikernel catalog tool configured to: receive the plurality of unikernels; generate the unikernel catalog; and store the unikernel catalog in the centralized service or store the unikernel catalog in a storage location, wherein the storage location is a local disk or a portable drive.

Example 20 is the system of example(s) 14-19, wherein the controller is further configured to detect an authentication verification failure during the execution of the catalog checkup, and wherein the controller, in response to detecting the authentication verification failure, is configured to determine a cause of the authentication verification failure; and transmit a notification indicating the authentication verification failure and the cause of the verification authentication failure to the target device.

Example 21 is a system comprising: a processing device; and a memory device including instructions that are executable by the processing device for causing the processing device to perform operations comprising: receiving a plurality of unikernels associated with a target device; generating catalog metadata describing executable files of each unikernel of the plurality of unikernels; generating a unikernel catalog that comprises the plurality of unikernels and the catalog metadata; and storing the unikernel catalog in a storage location or a centralized service associated with the target device.

Example 22 is the system of example 21, wherein the memory device includes instructions that are executable by the processing device for causing the processing device to: receive the unikernel catalog from the storage location or the centralized service; execute a catalog checkup to authenticate the unikernel catalog; in response to authenticating the unikernel catalog: extract a unikernel of the plurality of unikernels associated with the target device from the unikernel catalog; and deploy the unikernel at the target device.

Example 23 is the system of example(s) 21-22, wherein each unikernel of the plurality of unikernels comprises unikernel metadata, and wherein the memory device includes instructions that are executable by the processing device for causing the processing device to execute the catalog checkup to authenticate the unikernel catalog by: determining a provider entity for each unikernel of the plurality of unikernels based the unikernel metadata; and verifying that the provider entity for each unikernel of the plurality of unikernels is a secure provider entity.

Example 24 is the system of example(s) 21-23, wherein the memory device includes instructions that are executable by the processing device for causing the processing device to execute the catalog checkup to authenticate the unikernel catalog by: determining a provider entity for the unikernel catalog based on the catalog metadata; and verifying that the provider entity for the unikernel catalog is a secure provider entity.

Example 25 is the system of example(s) 21-24, wherein the memory device includes instructions that are executable by the processing device for causing the processing device to: transfer the unikernel catalog from the storage location to the centralized service or transfer the unikernel catalog from the centralized service to the storage location.

Example 26 is the system of example(s) 21-25, wherein the storage location is a portable device or a local disk, and wherein the centralized service is a registry comprising a plurality of unikernal catalogs including the unikernal catalog.

Example 27 is a method comprising: detecting, by a processing device, a plurality of unikernels associated with a target device; generating, by the processing device, catalog metadata describing executable files of each unikernel of the plurality of unikernels; generating, by the processing device, a unikernel catalog that comprises the plurality of unikernels and the catalog metadata; and storing, by the processing device, the unikernel catalog in a storage location or in a centralized service accessible by a controller associated with the target device.

Example 28 is the method of example 27, further comprising: receiving the unikernel catalog from the storage location or the centralized service; executing a catalog checkup to authenticate the unikernel catalog; in response to authenticating the unikernel catalog: extracting a unikernel of the plurality of unikernels associated with the target device from the unikernel catalog; and deploying the unikernel at the target device.

Example 29 is the method of example(s) 27-28, wherein each unikernel of the plurality of unikernels comprises unikernel metadata, and wherein executing the catalog checkup to authenticate the unikernel catalog comprises: determining a provider entity for each unikernel of the plurality of unikernels based the unikernel metadata; and verifying that the provider entity for each unikernel of the plurality of unikernels is a secure provider entity.

Example 30 is the method of example(s) 27-29, wherein executing the catalog checkup to authenticate the unikernel catalog comprises: determining a provider entity for the unikernel catalog based on the catalog metadata; and verifying that the provider entity for the unikernel catalog is a secure provider entity.

Example 31 is the method of example(s) 27-30, further comprising transferring the unikernel catalog from the storage location to the centralized service or transferring the unikernel catalog from the centralized service to the storage location.

Example 32 is a system comprising: means for deploying a unikernel at a target device by: receiving a unikernel catalog comprising a plurality of unikernels and catalog metadata, each unikernel of the plurality of unikernels comprising unikernel metadata and executable files; executing a catalog checkup to authenticate the unikernel catalog; in response to authenticating the unikernel catalog, extracting a unikernel of the plurality of unikernels from the unikernel catalog; and means for receiving the unikernel and executing the executable files of the unikernel.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer-readable medium comprising instructions that are executable by a processing device for causing the processing device to:

receive, by a controller, a unikernel catalog comprising a plurality of unikernels and catalog metadata, each unikernel of the plurality of unikernels comprising unikernel metadata and executable files;

execute, by the controller, a catalog checkup to verify the unikernel catalog by:

determining a provider entity for the unikernel catalog based on the catalog metadata; and verifying that the provider entity for the unikernel catalog is a secure provider entity; and in response to verifying the unikernel catalog:

extract, by the controller, a unikernel of the plurality of unikernels associated with a target device from the unikernel catalog; and deploy, by the controller, the unikernel at the target device.

2. The non-transitory computer-readable medium of claim 1, further comprising instructions executable by the processing device for causing the processing device to execute the catalog checkup to verify the unikernel catalog by:

determining a provider entity for each unikernel of the plurality of unikernels based the unikernel metadata; and verifying that the provider entity for each unikernel of the plurality of unikernels is a secure provider entity.

3. The non-transitory computer-readable medium of claim 1, wherein the unikernel catalog is received from a centralized service configured to store a plurality of unikernel catalogs including the unikernel catalog, and further comprising instructions executable by the processing device for causing the processing device to, prior to receiving the unikernel catalog, request the unikernel catalog from the centralized service.

4. The non-transitory computer-readable medium of claim 1, wherein the unikernel catalog is received from a storage location accessible by the controller, wherein the storage location is a local disk or a portable drive, and further comprising instructions executable by the processing device for causing the processing device to, prior to receiving the unikernel catalog, access the storage location.

5. The non-transitory computer-readable medium of claim 1, further comprising instructions executable by the processing device for causing the processing device to:

detect a verification failure during execution of the catalog checkup;

in response to detecting the verification failure:

determine a cause of the verification failure; and transmit a notification indicating the verification failure and the cause of the verification failure to the target device.

6. A method comprising:

receiving, by a controller of a node in a distributed computing environment, a unikernel catalog comprising a plurality of unikernels and catalog metadata;

executing, by the controller, a catalog checkup to verify the unikernel catalog by:

determining a provider entity for the unikernel catalog based on the catalog metadata; and verifying that the provider entity for the unikernel catalog is a secure provider entity; and in response to verifying the unikernel catalog:

detecting, by the controller, a unikernel of the plurality of unikernels associated with a target device of the distributed computing environment;

extracting, by the controller, the unikernel from the unikernel catalog; and deploying, by the controller, the unikernel at the target device.

7. The method of claim 6, wherein each unikernel of the plurality of unikernels comprises unikernel metadata, and wherein executing the catalog checkup to verify the unikernel catalog comprises:

determining a provider entity for each unikernel of the plurality of unikernels based the unikernel metadata; and verifying that the provider entity for each unikernel of the plurality of unikernels is a secure provider entity.

8. The method of claim 6, wherein the unikernel catalog is received from a centralized service configured to store a plurality of unikernel catalogs including the unikernel catalog.

9. The method of claim 8, further comprising, prior to receiving the unikernel catalog, requesting the unikernel catalog from the centralized service.

10. The method of claim 6, wherein the unikernel catalog is received from a storage location associated with the node, wherein the storage location is a local disk or a portable drive, and wherein the method further comprises, prior to receiving the unikernel catalog, accessing the storage location.

11. The method of claim 6, further comprising:

detecting a verification failure during the execution of the catalog checkup;

in response to detecting the verification failure:

determining a cause of the verification failure; and transmitting a notification indicating the verification failure and the cause of the verification failure to the target device.

12. A system comprising:

a node of a distributed computing environment comprising:

a controller configured to deploy a unikernel at a target device of the distributed computing environment by:

receiving a unikernel catalog comprising a plurality of unikernels and catalog metadata, each unikernel of the plurality of unikernels comprising unikernel metadata and executable files;

executing a catalog checkup to verify the unikernel catalog by:

determining a provider entity for the unikernel catalog based on the catalog metadata; and verifying that the provider entity for the unikernel catalog is a secure provider entity;

in response to verifying the unikernel catalog, extracting a unikernel of the plurality of unikernels from the unikernel catalog; and the target device configured to receive the unikernel from the controller and to execute the executable files of the unikernel.

13. The system of claim 12, wherein the controller executes the catalog checkup to verify the unikernel catalog by:

determining a provider entity for each unikernel of the plurality of unikernels based the unikernel metadata; and verifying that the provider entity for each unikernel of the plurality of unikernels is a secure provider entity.

14. The system of claim 12, further comprising a centralized service configured to store a plurality of unikernel catalogs including the unikernel catalog and configured to transfer the unikernel catalog to the node.

15. The system of claim 14, wherein the controller is further configured to, prior to receiving the unikernel catalog, request the unikernel catalog from the centralized service based on at least one unikernel of the plurality of unikernels being associated with the target device.

16. The system of claim 14, further comprising a unikernel catalog tool configured to:

receive the plurality of unikernels;

generate the unikernel catalog; and store the unikernel catalog in the centralized service or store the unikernel catalog in a storage location, wherein the storage location is a local disk or a portable drive.

17. The system of claim 12, wherein the controller is further configured to detect an authentication verification failure during the execution of the catalog checkup, and wherein the controller, in response to detecting the authentication verification failure, is configured to:

determine a cause of the authentication verification failure; and transmit a notification indicating the authentication verification failure and the cause of the verification authentication failure to the target device.

* * * * *